United States Patent [19]
Mickowski

[11] 3,878,375
[45] Apr. 15, 1975

[54] RAM VELOCITY MEASURING APPARATUS

[76] Inventor: John Mickowski, 470 Richmond Ave., Maplewood, N.J. 07040

[22] Filed: May 10, 1974

[21] Appl. No.: 469,047

[52] U.S. Cl. ........ 235/151.32; 356/28; 235/92 MT; 235/183
[51] Int. Cl. .................... G01p 3/36; G06f 15/20
[58] Field of Search ......... 235/151.32, 92 MT, 183; 356/27, 28; 343/8

[56] References Cited
UNITED STATES PATENTS

| | | | |
|---|---|---|---|
| 3,227,888 | 1/1966 | Shepherd et al. | 250/237 |
| 3,799,671 | 3/1974 | Schweizer | 356/28 |
| 3,804,518 | 4/1974 | Meyr | 356/28 |
| 3,813,166 | 5/1974 | Mary | 356/28 |

Primary Examiner—Felix D. Gruber
Assistant Examiner—Edward J. Wise
Attorney, Agent, or Firm—Philip D. Amins

[57] ABSTRACT

An apparatus for measuring the velocity of a ram used in die casting operations comprising a signal source, reflecting means of predetermined size affixed to the ram and solid state circuitry for generation of a start (S) signal pulse and a time (T) signal pulse. The duration of the time signal pulse (T) is proportional to the velocity of the ram and by means of double integration and counting reference clock pulses for the duration of the generated time (T) signal, the velocity of the ram may be obtained and displayed in indicia representing units of velocity.

6 Claims, 2 Drawing Figures

RAM VELOCITY MEASURING APPARATUS

BACKGROUND OF THE INVENTION

The present invention relates to velocity measuring apparatus and, in particular, to a solid state electronic means for accurately measuring the velocity of a ram used in the production of die castings.

As used herein the term integrated circuit modules or solid state electronic circuitry refers to a unitary or monolithic semiconductor structure or chip incorporating the equivalent of a network of interconnected active and passive electrical circuit elements such as transistors, diodes, resistors, capacitors and the like.

Prior art velocity measuring apparatuses of which I am aware, generally utilize a pair of signal pulses generated by a reference point on the moving object as its passes a pair of sensing means. The signal pulses so generated may be optical such as provided by a light beam, or electrical, such as that generated by a radio beam or magnetic lines of flux. The distance or time between the two signal pulses are measured in various ways, e.g., display of the pair of signal pulses on a calibrated oscilloscope with the horizontal scale calibrated in units of velocity, or electronically, by delaying the first signal pulse until it coincides with the second signal pulse, the delay time being proportional to the velocity of the object, etc. These systems are very cumbersome and have proven to be inaccurate for both relatively slow velocities and relatively fast velocities. Furthermore, these systems have been difficult to implement since the vibrations caused by the ram or pistonn requires that the sensitive measuring apparatus must be remotely located from the ram mechanism so as not to be subject to the shock and vibration caused thereby.

The present invention overcomes the problems found in the prior art by effectively measuring the width of a single reflected signal or time pulse (T) generated by a reflector of predetermined length as it passes a sensing means responsive thereto; the signal time pulse width is thus proportional to the velocity of the moving object or ram. An auxiliary signal pulse (S), referred to as a start signal pulse, associated with the time pulse (T) is utilized to set the start position of all the solid state logic means utilized therewith so that the measurement of the timed signal pulse width may start with the leading edge of the timed signal pulse (T) and end with the trailing edge thereof.

Accordingly, it is an object of the present invention to provide an improved velocity measuring device which avoids one or more of the disadvantages and limitations of prior art arrangements.

Another object of the present invention is to measure the velocity of a ram at a particular point in the forward stroke thereof.

A further object of the present invention is to measure the velocity of a ram by measuring the width of a single signal pulse generated by a means of a predetermined length affixed thereon.

A still further object of the present invention is to measure the velocity of a ram by measuring the width of a single signal pulse generated by a means of a predetermined length affixed thereon only if preceded by a start signal pulse.

Another object of the present invention is to provide a relatively inexpensive solid sate means for measuring the velocity of a moving object.

It is yet a further object of the present invention to provide a method for measuring the velocity of a moving object by measuring the width of a pulse generated by a means having a predetermined length affixed thereon.

An exemplary apparatus for measuring the velocity of an object such as a ram includes a primary signal source positioned proximate the object for generating a primary signal for a predetermined length along the direction of motion of the object; first and second circuit means positioned proximate the object for generating a start signal pulse (S) and a time signal pulse (T) responsive to the first and second reflected primary signals, respectively. The apparatus also includes a reference clock circuit means for providing timing pulses, direction sensing circuit means coupled to the first and second circuit means and the reference clock circuit means for providing an output pulse responsive to the coincidence of the leading edges of a clock reference timing pulse and a timed signal pulse (T), only when preceded by a start signal pulse (S), the direction sensing output pulse being proportional to the duration of the time signal pulse, first and second integration circuit means, the integration cicuit means having first and second input terminals and an output terminal, the first integration circuit means being coupled to the first input terminal of the second integration circuit means, the first terminal of the first integrator circuit means being coupled to a reference voltage or a ground reference responsive to a switching signal, the first integration circuit means integrating the reference voltage responsive to the duration of said direction sensing output pulse, the second input terminal of the first integration circuit being coupled to a reference ground. Further included are comparator circuit means having first and second input terminals and an output terminal, the comparator means first input terminal being coupled to the second integrator circuit means output terminal, the comparator means second input terminal being coupled to the reference voltage or the ground reference responsive to a switching signal, the comparator means output terminal being coupled to the second input terminal of the second integrator circuit means responsive to a switching signal, the comparator circuit means providing a change in output signal voltage at the comparator means output terminal when the comparator means input terminal reaches a predetermined voltage, switching and counting circuit means, the switching and counting circuit means being coupled to the first and second integration circuit means, the comparator circuit means output terminal and the reference clock circuit means; and providing the switching pulses and determining the sequence of operation of the first and second integration circuit means and the comparator circuit means; and counting the reference timing pulses provided by the reference clock circuit means from the time the timing pulse (T) ends until the time the comparator circuit means provides a change in signal voltage at the comparator circuit means output terminal; and display means coupled to said switching and counting circuit means for displaying the number of clock timing pulses counted in indicia representing units of velocity.

A method of measuring the velocity of an object comprises, according to the principles of the present invention, obtaining first and second signal pulses from the object along the direction of motion of said object, at least said second signal being generated by means representative of a predetermined distance thereon, generating a start signal pulse (S) and a time signal pulse (T) responsive to said first and second primary signals, providing reference timing pulses from a reference circuit means, obtaining an output pulse responsive to the coincidence of the leading edges of a clock pulse and a time signal pulse (T) only when preceded by a start signal pulse (S), said output pulse being proportional to the duration of said time signal pulse (T), integrating a fixed reference voltage for the duration said time signal pulse (T) in a first integration circuit means and providing an output signal voltage, integrating the output signal voltage obtained from the first integration circuit means; comparing the output from said second integrating circuit means and said reference voltage in a comparator ccircuit means adapted to provide a change in polarity of output signal voltage when said input signal voltage thereto reaches a predetermined signal voltage, providing switching means and counting means for generating switching pulses to determine the operating sequences of the first and second integration circuit means and the comparator circuit means, and for counting the timing pulses for the duration of said time signal pulse (T), and displaying said number of pulses counted in indicia representing units of velocity.

BRIEF DESCRIPTION OF THE DRAWING

The foregoing objects, features and advantages of the present invention will become more apparent from the following detailed description when considered in conjunction with the accompanying drawings, wherein.

DESCRIPTION OF THE PREFERRED EMBODIMENT

Figure 1:
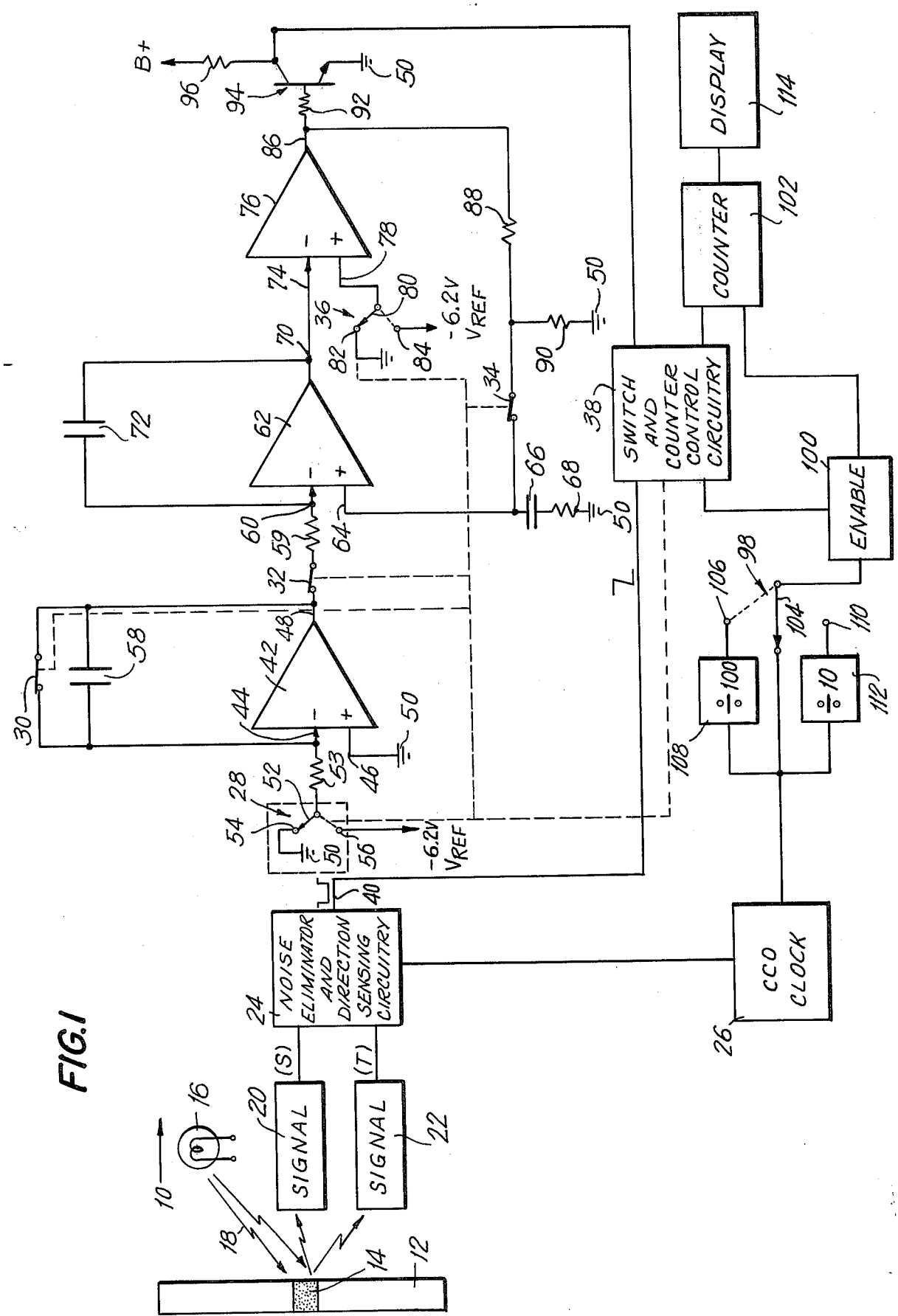
FIG. 1 schematically illustrates an apparatus constructed pursuant to the principles of the present invention.

Referring now to FIG. 1, there is schematically illustrated a velocity measuring apparatus 10 constructed in accordance with the principles of the present invention. The velocity measuring apparatus 10 utilizes a plurality of integrated circuit modules or solid state electronic circuitry of conventional types presently available on the market. The ram or other object 12 whose velocity is to be measured is provided in the preferred embodiment with a reflecting surface 14 affixed thereon and having a predetermined dimension in the direction of movement thereof. Preferably, the reflecting surface or flag 14 is 1 inch in length in the direction of travel of the object 12 such as a ram used in the production of die castings.

Preferably, the electronic circuitry of the velocity measuring apparatus 10 is conveniently mounted in a housing, not shown, proximate the object to be measured. This is not a necessary requirement for accurate measurements since the electronic circuitry may also be remotely located. A light source 16 is preferably mounted proximate the ram 12 in order that the light rays 18 emanating from the light source 16 may fall on the reflecting surface 14 and be reflected to photosensitive amplifying devices 20 and 22, as the reflecting surface 14 moves past these devices. The photosensitive amplifying devices 20 and 22 are of conventional design and are adapted to provide an output signal pulse when the reflected light rays 18 impinge thereon.

The output electrical signal pulse generated by amplifying device 20 will be referred to hereinafter as a start pulse (S) and the output electrical signal pulse generated by amplifying device 22 will hereinafter be referred to as a timed electrical signal pulse (T). Although the present system utilizes two pulses for operation, it will become apparent that the start pulse (S) is used only to preset the solid state switches, sequence of operations of the circuitry, and the counter means; and the second or times pulse (T) has its width or duration, which is proportional to the velocity of the ram, measured according to the invention.

Figure 2:
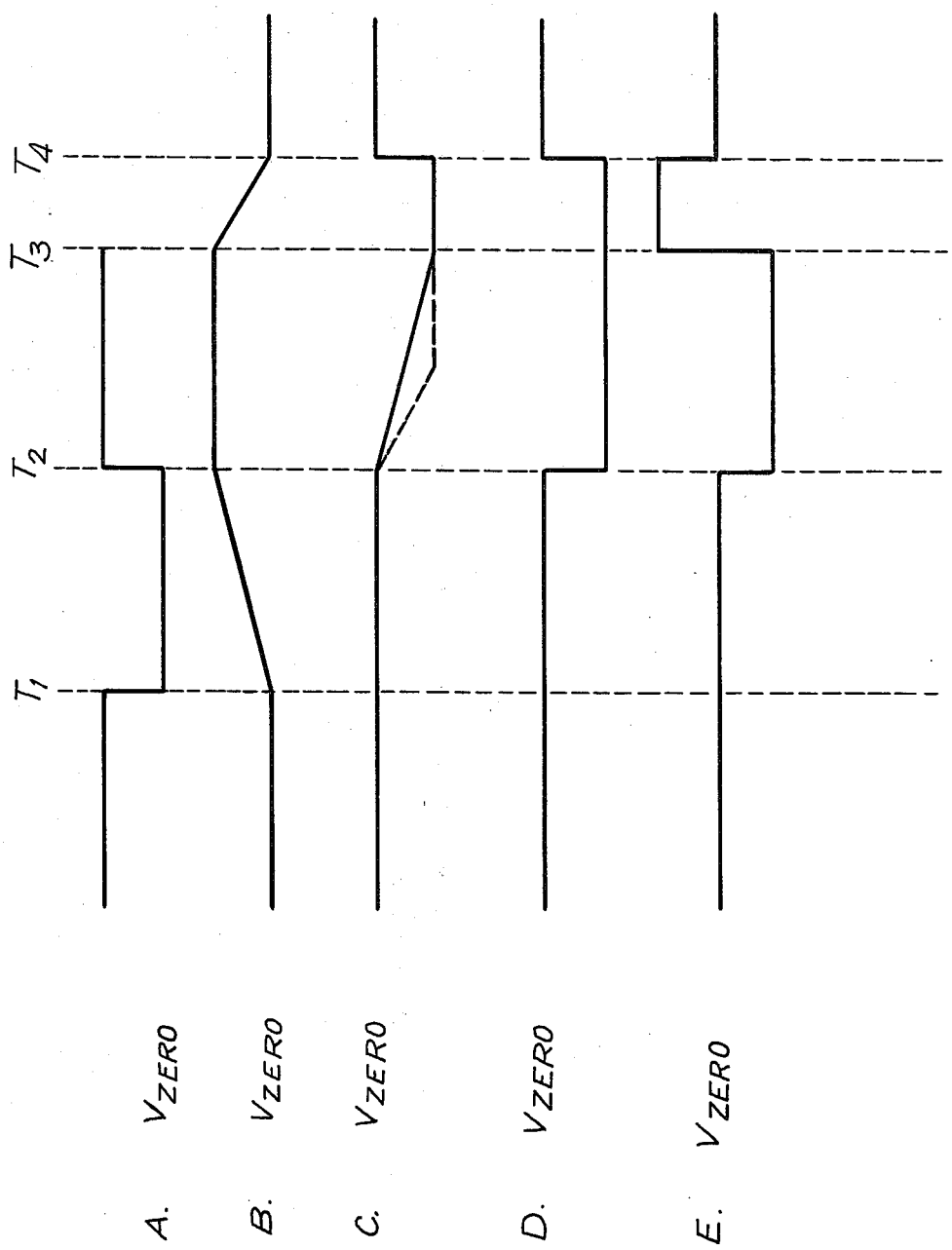
FIG. 2 illustrates a pictorial representation of voltage wave forms appearing at various critical points of the schematic of FIG. 1.

The photosensitive amplifying devices 20 and 22 are coupled to a conventional noise eliminator and direction sensing circuitry 24 which is comprised of a solid state module and provides an output pulse at its output terminal 40 as shown in FIG. 2A when the leading edge of the input timed pulse (T) coincides with the leading edge of a clock or reference timing pulse, now shown, is coupled thereto. The clock pulse is provided by conventional solid state clock circuitry 26. Direction sensing circuitry 24 has included therein an internal gating means which only provides an output timed pulse (T) at the output terminal 40 thereof only when pulse (T) is preceded by start pulse (S), so that only the forward velocity of the ram is measured and not the return stroke thereof.

The start pulse (S), provided by photosensitive amplifying device 20, is coupled to switches 28, 30, 32, 34 and 36. Although the switches are schematically represented as physical mechanical switches in FIG. 1, in the preferred embodiment, they are semiconductor switches physically included in the switch and counter and control solid state circuitry 38.

Each symbolically represented switch may include a plurality of conventional solid state switches, e.g., transistors, diodes, etc., which provide the functions indicated by the schematic switch symbols 28 and 36.

The timed electrical signal pulse (T) is coupled to the switch and counter control circuitry 38 shortly after the start pulse (S) sets the switches to their starting positions. The sequence of operation of the switches will be explained hereinafter.

The velocity measuring apparatus 10 also incorporates a first integration circuit arrangement which includes integrated circuit module 42. Integrated circuit module 42 is provided with an inverting input terminal 44 and a non-inverting input terminal 46 and an output terminal 48. The non-inverting input terminal 46 is coupled to a reference ground terminal 50. The inverting input terminal 44 of integrated circuit module 42 is coupled via resistor 53, to the movable contact arm 52 of switch 28, which is normally closed in its first position and connected to switch contact terminal 54 which is connected to ground reference terminal 50. In its second position, movable contact arm 52 of switch 28 is connected to switch contact terminal 56 which is coupled to a conventional voltage reference of −6.2 volts DC, not shown. Output terminal 48 is coupled to inverting input terminal 44 by means of the parallel combination of a capacitor 58 and switch 30. Switch 30 is normally closed shorting capacitor 58 and removing any residual charge which may accumulate thereon. Integrated circuit module 42 and capacitor 58 are thus arranged in a manner to perform a conventional integrating function.

The output terminal 48 of integrated circuit module 42 is coupled, via normally closed switch 32 and resistor 59, to the inventing input terminal 60 of integrated circuit module 62. Non-inverting input terminal 64 of module 62 is coupled, via a capacitor 66 and a resistor 68, to ground reference terminal 50. The output terminal 70 of integrated circuit module 62 is coupled to the inverting input terminal 60, via capacitor 72. The circuit arrangement of module 62 and capacitor 72 function as a second conventional integrating circuit.

The output terminal 70 of integrated circuit module 62 is coupled to the inverting input terminal 74 of comparator module 76. The non-inverting input terminal 78 of comparator module 76 is connected to the movable contact arm 80 of switch 36 which is normally closed in a first position and connected to switch terminal 82 which is coupled to reference ground terminal 50. In a second position movable contact arm 80 is connected to switch terminal 84 which is coupled to the conventional −6.2 volt reference voltage, not shown. The output terminal 86 of comparator 76 is coupled, via resistor 88 and normally closed switch 34, to the non-inverting input terminal 64 of module 62. The common connection of resistor 88 and switch 34 is coupled, via a resistor 90 to the reference ground terminal 50.

The output terminal 86 of comparator 76 is also coupled, via a resistor 92, to the base electrode of driver transistor 94. The emitter electrode of transistor 94 is connected to ground reference terminal 50, while the collector electrode of transistor 94 is coupled, via resistor 96, to a source of B+ which in the preferred embodiment is +5 volts D.C. The collector electrode of transistor 94 is also connected to the switch and counter control circuitry 38.

The reference clock circuitry 26 is coupled, via a range selector switch 98 and enable gate circuit 100 to a counter 102. The range selector switch 98 is a multiple position switch and its movable contact arm 104 may be positioned to switch contact 106 which allows the pulses from the clock circuitry 26 to be divided by 100 by conventional divider circuitry 108 before being coupled to the counter. Positioning the movable contact arm 104 of range selector switch 98 to switch contact 110 permits the pulses from the clock circuitry 26 to be divided by 10 before being coupled to the counter 102. Although a 100/1 and 10/1 divider is shown by way of illustration, it is to be understood that any conventional divider may be used by those experienced in the art to obtain the proper number of pulses from the clock circuitry 26 consistent with the velocity speeds to be measured.

The enable gate circuit 100 is also connected to the switch and counter control circuitry 38 which functions to start and stop the clock pulses from reaching the counter at the leading and trailing edges of the times signal pulse (T) respectively, as will be explained in more detail hereinafter.

The switch and counter control circuitry 38 is also connected to the counter 102 which is, in turn, connected to the display circuitry 114. The display circuitry may be a conventional digital readout, video readout, or recorder readout or any combination thereof. The readout, however, is in indicia representative of the velocity of the object (ram) 12 being measured.

In the operation of the apparatus, as the ram 12 starts to move in the direction that its velocity is to be measured, photosensitive amplifier 20 provides pulse (S) when it receives a reflection from the reflecting surface 14. This pulse (S) is coupled to switches 28, 30, 32, 34 and 36 closing them, preparatory to starting the measurement thereof. When the reflected light from reflecting surface 14 reaches amplifier 22, it generates a timed pulse (T) for the length of time it remains in-line with the photosensor of the photosensitive amplifying device 22. With no input signal, the comparator provides a zero output signal and the collector electrode of transistor 94 is at approximately +5 volts. The +5 volts at the collector of transistor 94 advances the switch and counter control circuitry 38 to turn off the counter and disable the enable gate circuit 100.

When the leading edge of a clock pulse coincides with the leading edge of the timed pulse (T), an output pulse, as shown in FIG. 2A at $T_1$, appears at output terminal 40. With the pulse at terminal 40 coupled to the switch and counter control, 38, switch 28 moves to its second position and is connected to the −6.2 volt reference, switch 30 opens permitting integration of the reference voltage with respect to time by the circuit arrangement of capacitor 58 and integrated circuit module 42 (FIG. 2B), switch 32 opens, switch 34 opens, and switch 36 remains coupled to ground. Since the input voltage of the comparator is zero volts (FIG. 2D), the comparator output voltage (FIG. 2E) remains at zero volts.

When the timed pulse (T) ends at $T_2$ its trailing edge (change to 0 volts) causes the switch and counter control circuitry 38 to change the movable arm 52 of switch 28 to its first or normal position which is ground reference and closes switch 32; switch 30 remains open and the movable arm 80 of switch 36 moves to its second position, viz., contact 84 which is coupled to the −6.2 volt reference.

Between time $T_1$ and time $T_2$ capacitor 58 charges to a voltage V which is proportional to the length of time or width of the timed pulse (T). At time $T_2$, when one side of resistor 53 is grounded by means of switch 28, the voltage on capacitor 58 is coupled, via closed switch 32, to the second integrator network comprised of capacitor 72 and integrated circuit module 62 where it is integrated with respect to time. Thus, the pulse (T) is effectively integrated a second time.

The larger the voltage V coupled to the second integrator network, the longer is the time that the reflector 14 has appeared before photosensitive amplifier 22 and, therefore, the slower is the velocity of the ram 12. Conversely, the smaller the voltage V coupled to terminal 60 of the second integrator network, the faster is the velocity of the ram 12. Therefore, the large the voltage coupled the second integrator, the larger will be the output voltage thereof, at terminal 70, and, thus, the shorter will be the time for capacitor 72 to charge to the reference voltage of −6.2 volts D.C., as shown by the dotted line of FIG. 2C.

At time $T_2$ the input terminal 74 of comparator 76 is switched to −6.2 volts D.C., therefore, a negative output voltage appears at comparator output terminal 86 keeping transistor 94 cut off or nonconducting and its collector electrode at the B+ voltage of +5 volts D.C. With both input voltages to the comparator 76 nearly equal, the comparator output voltage at terminal 86 goes to zero. As the voltage across capacitor 72 slightly exceeds the reference voltage of −6.2 volts D.C., the output voltage of the comparator 76 changes to a positive value preferably +5 volts D.C., shown at $T_3$ in FIG. 2E.

The positive voltage appearing at the base electrode of transistor 94 causes it to conduct or switch on thereby reducing the voltage at its collector electrode to approximately zero volts (less than one volt).

It is to be noted that by adjusting the reference voltage of −6.2 volts D.C., and the frequency of the clock generator, the system 10 may be calibrated and its accuracy maintained.

The zero voltage at the collector electrode of the transistor 94 is coupled to the switch and counter control circuitry 38 which provides a turnoff pulse to the enable gate 100, thereby preventing any additional clock pulses from entering the counter 102. In addition, the switch and counter control circuitry provides a blanking pulse to the display circuitry 114 from time $T_1$ to time $T_3$, and provides a latch strobe pulse to the display circuitry 114 from time $T_3$ to time $T_4$ causing the display to provide an illuminated indicia in units of velocity representing the pulses counted by the counter which are proportional to the velocity of the ram 12.

The feedback path from terminal 86 to input terminal 64 of integrated circuit module 62, including the circuit elements and switch 34 depicted in FIG. 1, is for the purpose of providing an error correction voltage for input voltage drift variations of the input voltages to 42, 62 and 76. Thus, the feedback path provides a compensatory voltage to insure that the accuracy of the apparatus is maintained. Thus, the switch 34, which is open during the measurement interval, prevents any undesirable feedback loop. However, the capacitor 66 and resistor 68 enable the error correction voltage to be maintained during actual measurements.

It is herein to be noted that although the present invention has been described wherein the start pulse (S) causes the switches 28, 30, 32 and 34 and 36 to be reset, it is within the realm of the present invention to merely employ the start pulse (S) to effect the operation of the circuit 24 and to have the switch and counter control circuitry 38 automatically reset the switches before each measurement or immediately after the system is turned on. Similarly, it is to be noted that the start (S) and time (T) pulses may be produced by interrupting a light source disposed on one side of the flag 14, and positioning the detectors 20 and 22 on the other side of the flag 14, whereby the passage of the flag between the light source 16 and detectors 20 and 22 would cause the detectors 20 and 22 to produce an output pulse when no light rays inpinge thereon.

Although I have stated that the time pulse (T) is proportional to the ram velocity, the mathematical equation for the same shows an inverse proportional relationship.

It will therefore be apparent that I have disclosed a new and novel method and apparatus for accurately and reliably measuring the velocity of an object such as a ram.

It will be understood that various changes, modifications and additions in the details, material and arrangement of the parts and operating conditions which have been described and illustrated herein, in order to explain the nature of the invention, may be made by those skilled in the art, since only that which is necessary to explain the principles of the invention has been disclosed. It is to be understood that conventional circuitry known by those skilled in the art has not been described in detail. The foregoing detailed description is, therefore, not to be taken in a limiting sense, and the scope of the present invention is best defined by the appended claims.

What is claimed is:

1. An apparatus for measuring the velocity of an object comprising
   a. a primary signal source positioned proximate said object for generating first and second primary signals;
   b. means affixed on said object adapted to produce said primary signals for a predetermined length along the direction of motion of said object;
   c. first and second circuit means positioned proximate said object for generating a start signal pulse (S) and a timed signal pulse (T) responsive to said first and second primary signals respectively;
   d. reference clock circuit means for providing reference timing pulses;
   e. direction sensing circuit means coupled to said first and second circuit means and said reference clock circuit means for providing an output pulse responsive to the coincidence of the leading edges of a clock reference timing pulse and a timed signal pulse (T) only when preceded by a start signal pulse (S), said direction sensing output pulse being proportional to the duration of said timed signal pulse;
   f. first and second integration circuit means, said integration circuit means having first and second input terminals and an output terminal, said first integration circuit means being coupled to said first input terminal of said second integration circuit means, said first input termial of said first integration circuit means being coupled to a reference voltage or a ground reference responsive to a switching signal, said first integration circuit means integrating said reference voltage responsive to the duration of said direction sensing output pulse, said second input terminal of said first integration circuit means being coupled to a reference ground, said second integration circuit means being adapted to integrate the voltage appearing at said output terminal at said first integration circuit means;
   g. comparator circuit means having first and second input terminals and an output terminal, said comparator means first input terminal being coupled to said second integration circuit means output terminal, said comparator means second input terminal being coupled to said reference voltage or said ground reference responsive to a switching signal, said comparator means output terminal being coupled to said second input terminal of said second integrator circuit means responsive to a switching signal, said comparator circuit means providing a change in output signal voltage at said comparator means output terminal when said comparator means input terminal reaches a predetermined voltage;
   h. switching and counting circuit means, said switching and counting circuit means being coupled to said first integration circuit means, said second integration circuit means and to said comparator circuit means output terminal, said switching and counting circuit means being coupled to said reference clock circuit means and providing said switching pulses and determining the sequence of operation of said first integration circuit means, said second integration circiut means and said comparator circuit means, said switching and counting circuit means counting said reference timing pulses provided by said reference clock circuit means from the time said timed pulse (T) ends until the time said comparator circuit means provides a change in signal voltage at said comparator circuit means output terminal; and i. display means coupled to said switching and counting circuit means for displaying the number of clock timing pulses counted as an indicia representing units of velocity.

2. An apparatus for measuring the velocity of an object according to claim 1, wherein
said primary signal source is a light source and said primary signal means is a reflecting surface of predetermined length.

3. An apparatus for measuring the velocity of an object according to claim 1, wherein
said first and second circuit means are photoelectric devices.

4. An apparatus for measuring the velocity of an object according to claim 1, wherein
said circuit means comprises integrated circuit modules including a plurality of solid state active and passive devices.

5. The method of measuring the velocity of an object comprising
 a. obtaining first and second primary signals from said object along the direction of motion of said object, at least said second signal being generated by means representative of a predetermined distance thereon;
 b. generating a start signal pulse (S) and a timed signal pulse (T) responsive to said first and second primary signals;
 c. providing reference timing pulses from a reference circuit means;
 d. obtaining an output pulse responsive to the coincidence of the leading edges of a clock pulse and a timed signal pulse (T) only when preceded by a start signal pulse (S), said output pulse being proportional to the duration of said timed signal pulse (T);
 e. integrating a fixed reference voltage for the duration of said timed signal pulse (T) in a first integration circuit means and providing an output signal voltage;
 f. integrating the output signal voltage obtained from said first integration circuit means;
 g. comparing the output voltage from said second integrating circuit means and said reference voltage in a comparator circuit means adapted to a change in polarity of output signal voltage when said input signal voltage thereto reaches a predetermined voltage;
 h. providing switching and counting means for generating switching pulses to determine the operating sequences of said first and second integrator and said comparator circuit means and for counting the timing pulses for the duration of said timed signal pulse (T); and
 i. displaying said number of pulses counted in indicia representing units of velocity.

6. An apparatus for measuring the velocity of an object comprising
first and second circuit means for obtaining a start (S) and a timed (T) electrical signal pulse, respectively, said start (S) and timed (T) pulses being responsive to the position of a moving object, said timed (T) signal pulse additionally being proportional to a predetermined length along the direction of motion of said object.
reference clock circuit means for providing timing pulses,
direction sensing circuit means coupled to said first and second circuit means and said reference clock circuit means for providing an output pulse responsive to the coincidence of the leading edges of a clock reference timing pulse and a timed signal pulse (T) only when preceded by a start signal pulse (S), said direction sensing output pulse being proportional to the direction of said timed signal pulse (T),
first and second intergration circuit means for integrating a voltage, said first integration circuit means being adapted to integrate a reference voltage responsive to the duration of said direction sensing output pulse, said second integration circuit mans being adapted to integrate the output voltage from said first integration circuit means appearing at the termination of said direction sensing output pulse,
comparator circuit means for comparing the output voltage from said second integration circuit means with said reference voltage, said comparator circuit means providing a change in output signal voltage when said second integrator circuit means output voltage reaches a predetermined value,
switching circuit means coupled to said first and second integrator circuit means and said comparator circuit means for determining the sequence of operation of said first and second integration circuit means and said comparator circuit means, said switching circuit means being responsive to the leading and trailing edges of said timed signal pulse (T),
counting circuit means coupled to said clock circuit means for counting said reference timing pulses from the time said timed pulse (T) ends until the output voltage from said comparator circuit means provides said change in output voltage, and
display means coupled to said counting circuit means for displaying the number of clock timing pulses counted in indicia representing units of velocity.

* * * * *